United States Patent
Machek

[11] 3,758,167
[45] Sept. 11, 1973

[54] BRAKE ANTI-LOCK MECHANISM
[75] Inventor: John A. Machek, Creve Coeur, Mo.
[73] Assignee: Wagner Electric Corporation, Newark, N.J.
[22] Filed: Jan. 17, 1972
[21] Appl. No.: 218,293

[52] U.S. Cl.................................. 303/40, 303/21 F
[51] Int. Cl............................................... B60t 8/12
[58] Field of Search...................... 137/596, 596.16; 188/181 A; 303/21 F, 21 CG, 29, 40

[56] References Cited
UNITED STATES PATENTS
3,022,118 2/1962 Dobrikin............................... 303/40
3,677,610 7/1972 Pauwels et al..................... 303/21 F Primary Examiner—Duane A. Reger
Attorney—Joseph E. Papin

[57] ABSTRACT

An electro-pneumatic control valve for use in a brake anti-lock system is provided with a relay portion for controlling fluid pressure applied to the system in response to predeterminately selected fluid pressure samples supplied thereto and electric sampling means responsive to signals supplied thereto upon the occurrence of pre-selected conditions in the brake system for controlling the fluid pressure samples supplied to said relay portion.

39 Claims, 2 Drawing Figures

BRAKE ANTI-LOCK MECHANISM

FIELD OF THE INVENTION

This invention relates generally to brake anti-lock systems and in particular to an electro-pneumatic control valve for use in such systems.

BACKGROUND OF THE INVENTION

In past brake anti-lock systems, various types of control valves were utilized to control the application of fluid pressure from a source thereof to at least some of the vehicle brakes of said brake system; however, one of the main undesirable or disadvantageous features of such past control valves was that they tended to overshoot in applying the pressure to the brake thereby driving the braked wheel to a locked condition. Another undesirable or disadvantageous feature of such past control valves was that such overshooting of the desired braking pressure which locked the vehicle wheel resulted in loss of vehicle steering stability and confused the system logic or electronics since the logic has difficulty in distinguishing between a stopped vehicle wheel and a locked vehicle wheel. Still another disadvantageous or undesirable feature of such past control valves was that they consumed or exhausted too much system pressure which burdened the make-up capabilities thereof. And yet another disadvantageous or undesirable feature of such past control valves was that they compared the instantaneous system pressure only with that which was applied immediately prior thereto.

The principle object of the present invention is to provide a control valve for a brake anti-lock system which overcomes the aforementioned disadvantageous or undesirable features of the past control valves, and this, as well as other objects and advantageous features of the present invention, will become apparent in the specification which follows.

SUMMARY OF THE INVENTION

Briefly, the present invention includes a control valve for a brake anti-lock system having relay means effecting the application to said system of supplied fluid pressure in response to system preselected fluid pressure samples subjected thereto, and other means actuated in response to the occurrence of preselected conditions during a braking application for controlling the magnitude of said samples and the sequencing of the subjection thereof to said relay means.

BRIEF DESCRIPTION OF THE DRAWINGS

In the drawings, which illustrate embodiments of the invention and wherein like numerals refer to like parts wherever they occur.

Figure 1:
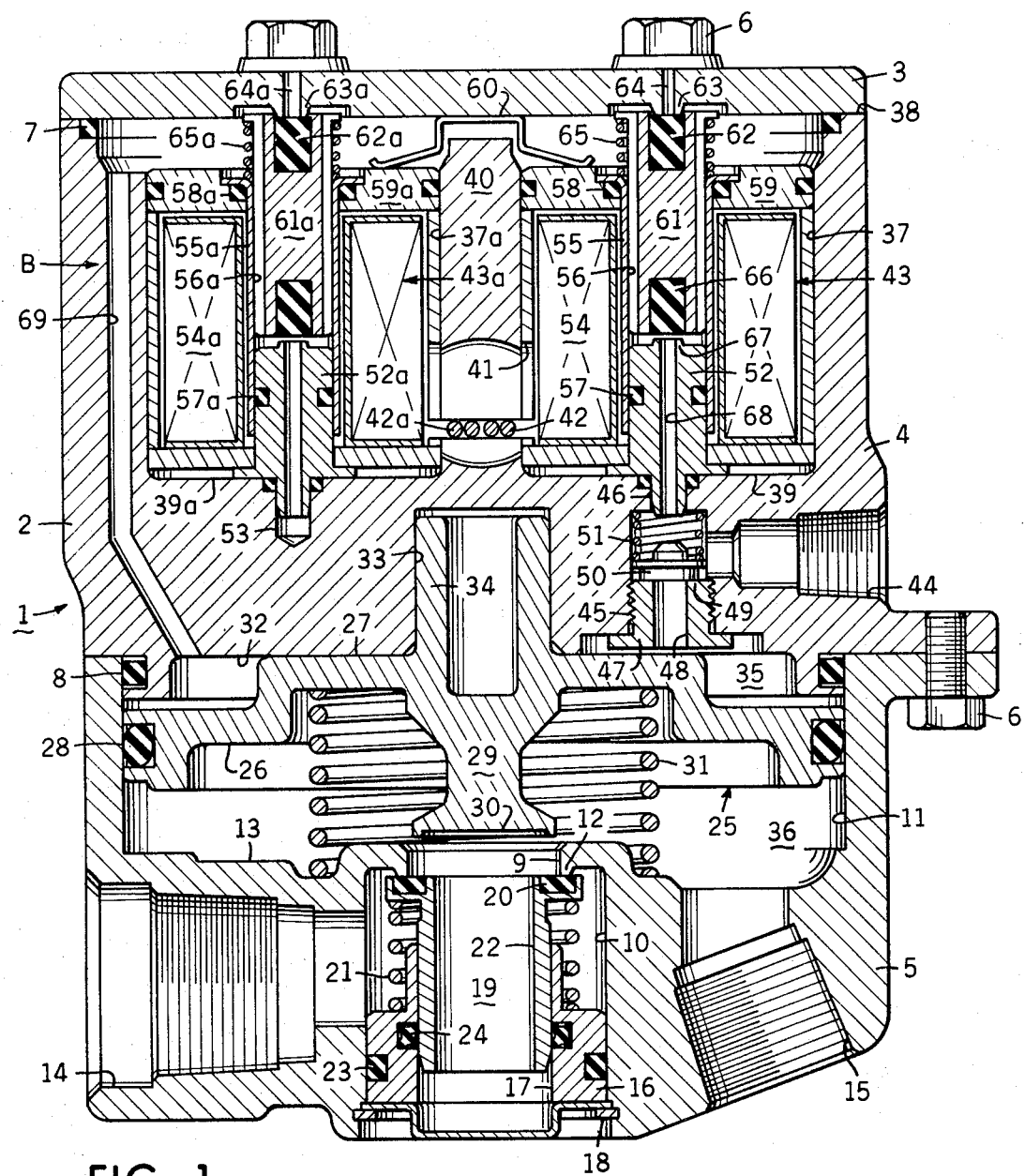
FIG. 1 is a sectional view showing a control valve embodying the present invention in cross-section.

Referring now to the drawing in detail, an anti-lock device or control valve 1 for a brake anti-lock system (not shown) is provided with a housing 2 having upper, intermediate and lower portions 3, 4, 5 which are interconnected by suitable means, such as the studs 6, and seals or O-ring members 7, 8 are sealably interposed between said upper and intermediate housing portions and said intermediate and lower housing portions, respectively.

The lower housing 5 is provided with a bore 9 interposed between opposed counterbores 10, 11, said counterbore 10 defining an inlet chamber, and opposed annular shoulders 12, 13 are provided on said housing at the intersections of said bore with said counterbores, respectively, said shoulder 12 defining a valve seat. An inlet port 14, which is adapted for connection with a fluid pressure source (not shown), is provided in the lower housing 5 intersecting with the counterbore 10, and an outlet port 15, which is adapted for connection with a vehicle brake (not shown), is also provided in said lower housing intersecting with the shoulder 13. A valve guide member 16 having a bore 17 therethrough is positioned in the lower end of the counterbore 10 against displacement by a groove and snap ring assembly 18, and a valve member 19 is slidably received in the guide bore 17 having a sealing head or portion 20 urged into sealing engagement with the valve seat 12 by the negligible force of a valve spring 21 interposed between said valve member and said guide isolating the inlet chamber 10. A bore or exhaust passage 22 is provided through the valve member 19 normally connecting the counterbore 11 to the atmosphere, and seals 23, 24 are carried in the guide member 16 in sealing engagement with the lower end of the counterbore 10 and said valve member, respectively. A relay member or piston 25 having opposed sides or faces 26, 27 is slidably received in the counterbore 11 carrying a peripheral seal or O-ring 28 in sealing engagement with said counterbore. An extension 29 is integrally formed with the piston 25 on the lower side 26 thereof having a free end portion 30 which defines a valve seat for engagement with the valve member 19 about the exhaust passage 22 thereof, as discussed hereinafter, and a return spring 31 is interposed between the relay piston side 26 and the housing shoulder 13 normally maintaining said valve seat 30 displaced from said valve member and urging the relay piston upper side 27 into abutment with the lower end or shoulder 32 of the intermediate housing 4 which closes the counterbore 11. The intermediate housing 4 is provided with a centrally located guide recess 33 therein which slidably and guidably receives another extension or guide 34 integrally formed with the relay piston upper side 27, and an expansible control or sampling chamber 35 is defined in the counterbore 11 between said relay piston upper face and said intermediate housing lower end in opposition to an outlet chamber 36 also defined in said counterbore between the relay piston lower face 26 and the housing shoulder 13.

The intermediate housing 4 is provided with companion solenoid chambers or bores 37, 37a intersecting with the upper end 38 of said intermediate housing and having base or end walls 39, 39a, and a wall 40 which is integral with said intermediate housing is provided between said solenoid chambers being cross-slotted at 41 to define a lead-out passage for the terminals 42, 42a of solenoids 43, 43a, as discussed hereinafter. A control or sampling port 44, which is adapted for connection with an operator controlled service foot or application valve of the brake system (not shown), is provided in the intermediate housing 4 intersecting with the larger of stepped vertical bores 45, 46, and said stepped bores intersect with the bore end wall 39 and intermediate housing lower end 32, respectively. An insert 47 is threadedly received in the lower end of the larger stepped bore 45 having a passage 48 therethrough connecting between the sampling chamber 35 and inlet port 44, and a valve seat 49 is provided on said insert about said passage for engagement with a uni-directional valve member or check valve 50 which is normally urged thereinto by the negligible force of a valve spring 51 biased between said check valve and the intermediate housing 4.

Solenoids 43, 43a are provided with pole pieces 52, 52a which extend coaxially into the solenoid chambers 37, 37a, and the pole piece 52 is seated in abutting engagement with the solenoid chamber end wall 39 extending into the smaller stepped bore 46 in supporting and guiding engagement therewith while th pole piece 52a is seated in abutting engagement with the solenoid chamber end wall 39a and extends into a recess 53 provided in the intermediate housing 4 in supporting and guiding engagement therewith. Annular cylindrical electrical coils 54, 54a of the solenoids 43, 43a are positioned in the solenoid chambers 37, 37a and supported on the pole pieces 52, 52a, and the terminal or leads 42, 42a of said coils are lead out of the intermediate housing 4 through the lead-out slots 41 for connection with the logic or electronic portion of the brake anti-lock system (not shown). Tubular or sleeve members 55, 55a having bores 56, 56a therethrough extend coaxially through the coils 54, 54a in sealing engagement with seals 57, 57a and 58, 58a respectively carried in the pole pieces 52, 52a and coil retainers 59, 59a which are retained in displacement preventing engagement with the upper end of said coils by a clip spring 60 biased between the housing cover 3 and said retainers.

Figure 2:
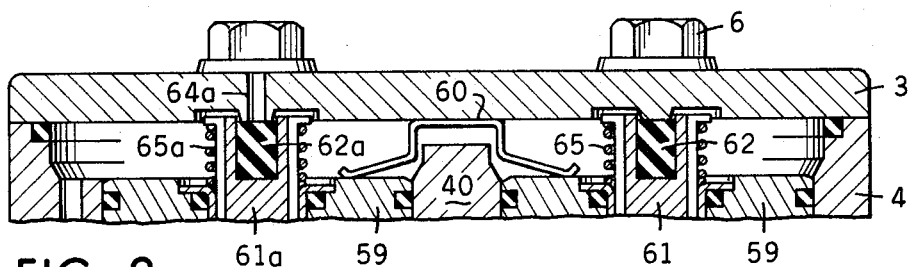
FIG. 2 is a partial sectional view illustrating another control valve embodying the present invention in cross-section.

Hexagonally shaped armature members 61, 61a of the solenoids 43, 43a are reciprocally received in the sleeve member bores 56, 56a having exhaust valve members 62, 62a in the upper ends thereof normally urged into sealing engagement with exhaust valve seats 63, 63a provided on the cover housing 3 about exhaust passages 64, 64a therein by the negligible force of return springs 65, 65a biased between said armature members and the retainers, respectively. In the preferred embodiment, it should be noted that the exhaust passage 64 is appreciably smaller than the exhaust passage 64a to restrict the relative rates of exhausting fluid pressure flow, as discussed hereinafter; however, it is apparent that exhaust passages 64, 64a can be of substantially equal size, if desired. The relative sizes of the exhaust passages 64, 64a depend, or are correlated with, the volumetric characteristics of the brake system (not shown), and if the volume of the brake system is relatively small, the exhaust passage 64 can be omitted, as shown in FIG. 2. Another valve member 66 is carried in the lower end of the armature 61 and normally displaced from sealing engagement with a valve seat 67 provided on the upper end of the pole piece 52 about a passage or bore 68 therethrough connecting the larger stepped bore 45 with the sleeve member bore 56. To complete the description of the control valve 1, another passage 69 is provided in the intermediate housing 4 connected between the sampling chamber 35 and the solenoid chambers 37, 37a above the retainers 59, 59a therein, and it is apparent that a restricted or tortuous flow passage means, indicated generally at B, is defined between the inlet port 44 and said sampling chambers by the larger stepped bore 45, the pole piece passage 68, the sleeve member bore 56, the portions of the solenoid chambers 37, 37a above the retainers 59, 59a therein, and the passage 69; however, while the restriction of the flow passage B is provided between the various components defining such, it is contemplated that said flow passage can also be restricted by various permanent or adjustable flow throttling or restricting devices such as orifices, vortexes, needle valves, or the like which are well known in the art.

OPERATION

With the component parts of the control valve 1 positioned as shown in the drawing and as described, if the vehicle operator desires to effect a service brake application or brake energization to decelerate the vehicle, a control or sampling fluid pressure is supplied to the control port 44 upon operator actuation of an application or foot valve of a type well known in the art (not shown). The control fluid pressure flows from the control port 44 through the flow passage B to the control chamber 35 acting on the effective area of the relay piston 25 therein to create a control force $Fc$ urging said relay piston downwardly against its return spring 31. This downward movement initially engages the relay piston valve seat 30 with the valve member 19 closing the exhaust passage 22 thereof and isolating the outlet chamber 36 from the atmosphere, and said downward movement thereafter urges said valve member against its valve spring 21 to a position disengaged from the housing valve seat 12 to establish pressure fluid communication between the inlet and outlet ports 14, 15. Supplied or input fluid pressure flows from its source (not shown) through the inlet port 14, the inlet chamber 10, the outlet chamber 36 to establish an output or applied fluid pressure at the outlet port 15 which is, of course, effective to energize the vehicle brakes (not shown) connected therewith and decelerate the vehicle.

When the reaction force $Fr$ created by the established output fluid pressure in the output chamber 36 acting on the effective area of the relay piston 25 therein substantially equals the control force $Fc$, said relay piston is moved upwardly toward a lapped position, and said valve member follows toward the lapped position in lapped engagement between the relay piston valve seat 30 and the housing valve seat 12. If a greater braking application is desired to increase the intensity of brake energization and vehicle deceleration, the magnitude of the control fluid pressure is increased which results in an increased control force $Fc$ to further actuate the relay piston 25 and valve member 19, as previously described, toward their lapped positions effecting a corresponding increase in the magnitude of the output fluid pressure.

If the desired braking effort or brake energization is attained without engendering a wheel lock-up or vehicle skid condition and the operator de-actuates the foot valve to exhaust the control fluid pressure at the control port 44 to the atmosphere, a fluid pressure differential is, of course, established across the unidirectional valve 50 between the control fluid pressure in the control chamber 35 and that exhausting to atmosphere through the control port 44, and said uni-directional valve is movable against its return spring 51 in response to said fluid pressure differential acting thereacross toward a position displaced from the insert valve seat 49 to open the insert passage 48 thereby effecting the exhausting flow of the control fluid pressure from the control chamber 35 through said insert passage and the housing larger stepped bore 45 directly to said control port which, in effect, "short-circuits" or by-passes the restricted flow passage means B to effect very rapid exhaustion of the control fluid pressure from the control chamber 35, the reaction force Fr and the return spring 31 urges the relay piston 25 upwardly toward its original position in engagement with the intermediate housing abutment 27 disengaging the valve seat 30 from the valve member 19 to again open the valve member exhaust passage 22 reestablishing exhausting communication between the outlet port and chamber 15, 36 and the atmosphere. In this manner, the output fluid pressure is exhausted from the brakes to effect de-energization thereof through the outlet port and chamber 15, 36 and the valve member exhaust passage 22 to the atmosphere, and upon such exhaustion of the output fluid pressure, the reaction force Fr is, of course, eliminated.

If the output fluid pressure applied to energize the vehicle brakes during the above-described brake application is of a magnitude great enough to effect a wheel lock-up or vehicle skid condition, the brake anti-lock system logic and sensor portions (not shown) ascertains such wheel lock-up and signals the control valve 1 indicating, in effect, that the magnitude of the output fluid pressure should be reduced. The logic signal excites or energizes the coil 54 of the solenoid 43 creating a magnetic force which moves the armature 61 downwardly against its return spring 65 into magnetic holding engagement with the pole piece 52, and in this manner, the armature valve member 66 is engaged with the pole piece valve seat 67 to close the pole piece passage 68 isolating the control port 44 while the armature exhaust valve member 62 is disengaged from the upper housing exhaust valve seat 63 to open the restricted exhaust passage 64. With the control port 44 isolated and the exhaust passage 64 so opened, a restricted exhausting flow of control fluid pressure is effected from the control chamber 35 through the passage 69, the portion of the solenoid chambers 37, 37a above the solenoid retainers 59, 59a, and the open exhaust passage 64 to the atmosphere thereby rather slowly reducing the magnitude of the control fluid in said control chamber to correspondingly reduce the magnitude of the control force Fc. Since the control fluid pressure is being exhausted to effect a continuous reduction of the control force Fc, the reaction force Fr urges the relay piston 25 upwardly from its lapped position to displace the valve seat 30 thereof from the valve member 19 thereby opening the valve member exhaust passage 22 and exhausting the output fluid pressure from the vehicle brakes to the atmosphere. Of course, it is apparent that such restricted exhausting flow of the control fluid pressure from the control chamber 35 effects a corresponding reduction of the output fluid pressure applied at the outlet port 15 and to the vehicle brake to also effect a corresponding reduction of the intensity of the brake energization.

If the aforementioned reduction of the intensity of the brake energization does not alleviate the wheel lock-up or vehicle skid condition, the sensor and logic portions of the brake system discern such and again signal the control valve 1 that such wheel lock-up is continuing indicating, in effect, that the output fluid pressure should be further reduced. This additional logic signal energizes the coil 54a of the solenoid 43a creating a magnetic force which moves the armature 61a downwardly against th return spring 65a into magnetic holding engagement with the pole piece 52a, and in this manner, the armature valve member 62a is displaced from the upper housing exhaust valve seat 63a to also open the exhaust passage 64a. With both the exhaust passages 64, 64a open and the control port 44 isolated, it is apparent that the control fluid pressure is now exhausted from the control chamber 35 at a more rapid rate providing a more rapid exhaustion of the outlet fluid pressure in the same manner as discussed hereinbefore which, of course, effects a corresponding reduction of the intensity of the energization of the vehicle brakes and a rather rapid alleviation of the wheel lock-up or skid condition.

When the sensor and logic portions of the brake system determine that the wheel lock-up condition has been alleviated, the signals to the solenoids 43, 43a of the control valve 1 are terminated which de-energizes the solenoid coils 54, 54a and elmininates the attractive magnetic force between the pole pieces 52, 52a and armatures 61, 61a, respectively. Upon the elimination of the magnetic force, the return springs 65, 65a move the armatures 61, 61a upwardly toward their original positions re-engaging the exhaust valve members 62, 62a with the upper housing valve seats 63, 63a closing the exhaust passages 64, 64a, respectively, and of course, the movement of the armature 61 to its original position also disengages the valve member 66 thereof from the pole piece valve seat 67 to open the pole piece passage 68 and re-establish pressure fluid communication through the flow passage B between the control port 44 and the control chamber 35.

When communication between the control port 44 and the control chamber 35 is re-established, the relay piston 25 and valve member 19 are again actuated to increase the magnitude of the output fluid pressure applied to the outlet port 15 and the vehicle brakes to effect a corresponding increase in the energization thereof, and if such increased brake energization again effects a wheel lock-up condition, the brake anti-lock system re-cycles wherein the sensor and logic portions thereof again signal the control valve 1 to reduce the output fluid pressure in the same manner as previously described. Of course, the brake anti-lock system and control valve 1 continue such re-cycling to alleviate the occurrence of wheel lock-up conditions until the desired vehicle deceleration is attained.

Referring now to FIG. 2, another anti-lock device or control 100 is shown functioning in substantially the same manner and having substantially the same component parts as the previously described control valve 1 with the exception that only the exhaust passage 64a is provided in the upper housing 103 of the control valve 100 since, as previously mentioned, the control valve 100 is contemplated for use in anti-lock brake systems having a comparatively small volumetric capacity.

In the operation of the control valve 100, the relay piston 25 is actuated in response to control fluid pressure applied to the control port and chamber 44, 35 to effect a corresponding output fluid pressure at the outlet port 15 for energizing the vehicle brakes, and if such brake energization results in a wheel lock-up condition, the sensor and logic portion effects a signal to energize the solenoid 43 and move the armature valve member 66 into engagement with the pole piece valve seat 67 closing the passage 68 to isolate said control port, as previously described. If the wheel lock-up continues, the sensor and logic portion effects the additional signal to energize the solenoid 43a and move the armature 61a into magnetic holding engagement with the pole piece 52a displacing the armature valve member 62a from the upper housing exhaust valve seat 63a to open the exhaust passage 64a, and the exhausting flow of control fluid pressure is thereby effected at a rather rapid rate from the control chamber 35 through the passage 69 and the open exhaust passage 64a to the atmosphere. When the control force Fc is so reduced, the reaction force Fr urges the relay piston 25 upwardly from its lapped position to disengage the valve seat 30 thereof from the valve member 19 to open its exhaust passage 22 and exhaust to the atmosphere the output fluid pressure applied to the brakes to reduce the intensity of the energization thereof. Upon alleviation of the wheel lock-up condition in response to the reduction of the intensity of the brake energization, the logic and sensor portions terminate the signals to the control valve 100 de-energizing the solenoids 43, 43a, and the armature return springs 65, 65a return the armatures 61, 61a to their original positions re-establishing pressure fluid communication between the control port and chamber 44, 35 through the flow passage B and re-engaging the valve member 62a with its valve seat 63a to close the exhaust passage 64a.

When pressure fluid communication is re-established between the control port and chamber 44, 35, the control force Fc again actuates the relay piston 25 and valve member 19 to re-establish or increase the output fluid pressure applied to the outlet port 15 and the vehicle brake to effect a corresponding increase in the energization thereof, and if such brake energization again results in a wheel lock-up condition, the brake anti-lock system recycles wherein the sensor and logic portions again signal the control valve 100 to reduce the output fluid pressure, as previously described. Of course, the brake anti-lock system and control valve 104 continues such re-cycling to alleviate the occurrence of wheel lock-up conditions until the desired vehicle deceleration is attained.

From the foregoing, it is now apparent that novel anti-lock devices 1, 100 meeting the objects and advantageous features set forth hereinbefore, as well as others, are provided and that changes as to the precise configurations, shapes and details of the constructions set forth in the disclosure by way of illustration may be made by those skilled in the art without departing from the spirit of the invention.

The embodiments of the invention in which an exclusive property or privilege is claimed are defined as follows:

1. A control valve for an anti-lock brake system comprising a housing, relay means movable in said housing and operable generally in response to control fluid pressure subjected thereto to effect a metered application through said housing of fluid pressure supplied thereto, and means for controlling the control fluid pressure subjected to said relay means comprising an electric solenoid valve energized in response to a preselected condition to isolate the control fluid pressure acting on said relay means and vent the isolated control fluid pressure, said relay means being responsive to the reduction of the control fluid pressure upon the venting thereof to effect a proportional reduction of the applied fluid pressure.

2. A control valve for an anti-lock brake system comprising a housing, relay means movable in said housing and operable generally in response to control fluid pressure subjected thereto to effect a metered application through said housing of fluid pressure supplied thereto, and means for controlling the control fluid pressure subjected to said relay means comprising a first electric solenoid means energized in response to a preselected condition to isolate the control fluid pressure acting on said relay means, and a second electric solenoid means energized in response to another preselected condition to vent the isolated control fluid pressure, said relay means being responsive to the reduced magnitude of the isolated control fluid pressure upon the venting thereof to effect a corresponding proportional reduction in the magnitude of the applied fluid pressure.

3. A control valve for an anti-lock brake system comprising a housing, relay means movable in said housing and operable generally in response to control fluid pressure subjected thereto to effect a metered application through said housing of fluid pressure supplied thereto, and means for controlling the control fluid pressure selectively subjected to said relay means including means for isolating the control fluid pressure acting on said relay means upon the occurrence of a preselected condition, and other means for venting the isolated control fluid pressure upon the occurrence of another preselected condition, said relay means being responsive to the reduced magnitude of the isolated control fluid pressure upon the venting thereof to effect a corresponding proportional reduction in the magnitude of the applied fluid pressure, and a restricted flow passage in said housing for the flow therethrough of the control fluid pressure upon the subjection thereof to said relay means, said included means and other means defining at least a portion of said restricted passage.

4. A control valve according to claim 3, comprising means in said housing including another flow passage connected across said restricted flow passage in by-pass relation with said included means and said other means, the control fluid pressure acting on said relay means being exhausted through said other flow passage in response to a fluid pressure differential established between the magnitudes of the control fluid pressure acting on said relay means and that supplied to said restricted flow passage.

5. A control valve according to claim 4, wherein said last named means also includes uni-directional valve means for controlling said other flow passage, said uni-directional valve means being normally urged toward a position closing said other flow passage and being movable toward an open position effecting the exhaustion of the control fluid pressure acting on said relay means in response to the fluid pressure differential established there-across between the magnitudes of the control fluid pressure acting on said relay means and that supplied to said restricted flow passage.

6. A control valve according to claim 2, wherein said first solenoid means also includes means for effecting venting of the isolated control fluid pressure upon the isolation thereof.

7. A control valve according to claim 2, wherein said first solenoid means is energized in response to the first named preselected condition to initially isolate the control fluid pressure acting on said relay means and thereafter effect venting of the isolated control fluid pressure.

8. A control valve according to claim 7, comprising a flow passage in said housing for the flow therethrough of the control fluid pressure upon the subjection thereof to said relay means, said first solenoid means defining with said housing at least a portion of said flow passage.

9. A control valve according to claim 8, comprising a first valve seat in said housing about said flow passage, and said first solenoid means comprising first valve means for engagement with said first valve seat, said first valve means being urged toward engagement with said first valve seat to close said flow passge and isolate the control fluid pressure acting on said relay means upon the energization of said first named solenoid means.

10. A control valve according to claim 9, comprising exhaust passage means in said housing and connected with said flow passage, a second valve seat in said housing about said exhaust passage means, said first solenoid means also comprising second valve means normally urged into engagement with said second valve seat closing said exhaust passage means, said second valve means being urged toward a position disengaged from said second valve seat to open said exhaust passage means and effect the venting of the isolated control fluid pressure upon the energization of said first solenoid means.

11. A control valve according to claim 10, comprising other exhaust passage means in said housing and connected with the control fluid pressure acting on said relay means, a third valve seat in said housing about said other exhaust passage means, said other solenoid means including third valve means normally urged into engagement with said third valve seat closing said other exhaust passage means, said third valve means being urged toward a position disengaged from said third valve seat to open said other exhaust passage means and effect further venting of the isolated control fluid pressure upon the energization of said other solenoid means.

12. A control valve according to claim 11, wherein said relay means defines with said housing a control chamber connected with said flow passage, other passage means in said housing connected between said control chamber and said flow passage in bypass relation therewith, the control fluid pressure in said control chamber being exhausted through said other passage means upon the exhaustion of the control fluid pressure subjected to said flow passage, a valve seat in said housing about said other passage means, and valve means being normally engaged with said valve seat to close said other passage means, said valve means being urged toward a position disengaged from said valve seat to open said other passage means and effect the exhausting passage therethrough of the control fluid pressure in response to a fluid pressure differential established across said valve means between the magnitudes of the control fluid pressure in said control chamber and that of the exhausting control fluid pressure subjected to said flow passage.

13. A control valve for an anti-lock brake system comprising a housing, relay means movable in said housing and defining therewith a control chamber, said relay means being operable generally in response to control fluid pressure in said chamber to effect the application and exhaustion of braking fluid pressure to and from said system, a control port in said housing for connection with supplied and exhausting flows of control fluid pressure, a flow passage in said housing connected between said control port and chamber, a pair of solenoid means in said housing for energization upon the occurrence of a pair of preselected conditions and defining at least portions of said restricted flow passage including a pair of exhaust valve means in said restricted flow passage and controlling the exhaustion of control fluid pressure therethrough from said control chamber, respectively, and one of said solenoid means including other valve means controlling the passage of the control fluid pressure through said restricted flow passage and connected for concerted movement with one of said exhaust valve means, said one solenoid means being energized upon the occurrence of one of said preselected conditions to urge said other valve means and one exhaust valve means toward positions in said restricted flow passage isolating the control fluid pressure in said control chamber from said control port and exhausting the isolated control fluid pressure from said control chamber, respectively, and the other of said solenoid means being thereafter energized upon the occurrence of the other of said preselected conditions to urge the other of said exhaust valve means toward a position in said restricted flow passage further exhausting the isolated control fluid pressure from said control chamber when said one solenoid is energized.

14. A control valve according to claim 13, comprising passage means in said housing connected between said control chamber and port in by-pass relation with said restricted flow passage, and check valve means controlling said passage means, said check valve means being normally urged toward a position closing said passage means and being movable toward a position opening said passage means to permit exhausting flow therethrough of the control fluid pressure from said control chamber in response to a pressure differential acting across said check valve means between the magnitudes of the control fluid pressure in said control chamber and the selective exhausting flow of the control fluid pressure at said control port.

15. A control valve according to claim 13, comprising a pair of exhaust passages in said housing, said exhaust valve means being normally urged toward positions in said housing closing said exhaust passages and being actuated toward positions in said housing opening said exhaust passages to effect the exhaustion of the isolated control fluid pressure upon the energization of said solenoid means, respectively.

16. A control valve according to claim 15, wherein one of said exhaust passages is predeterminately smaller than the other thereof.

17. A control valve according to claim 16, wherein said one exhaust passage is connected with said restricted flow passage between said other valve means and said control chamber, and the other of said exhaust passages is connected with said restricted flow passage between said one exhaust passage and said control chamber.

18. A control valve according to claim 16, comprising a pair of exhaust valve seats on said housing about said exhaust passages for engagement with said exhaust valve means, said exhaust valve means being normally urged into engagement with said exhaust valve seats to close said exhaust passages and being actuated toward positions disengaged from said valve seats to effect the exhaustion of the isolated control fluid pressure upon energization of said solenoid means, respectively.

19. A control valve according to claim 18, wherein said one solenoid means includes a pole piece supported in said housing, other passage means extending through said pole piece and defining a portion of said restricted flow passage, winding means in said housing about said pole piece for excitation upon the occurrence of said one preselected condition, armature means movable in said one solenoid means upon the excitation of said winding means, said armature means including said one exhaust valve means and said other valve means, a third valve seat on said pole piece about said other passage means for engagement with said other valve means, and spring means engaged with said armature means normally urging said one exhaust valve means into engagement with one of said exhaust valve seats and said other valve means toward a position disengaged from said third valve seat, said armature being movable against said spring means in response to the excitation of said winding means toward a position engaging said other valve means with said third valve seat to isolate the control fluid pressure in said control chamber and also disengaging said one exhaust valve means from said one exhaust valve seat to open said one exhaust passage and effect the exhaustion of the isolated control fluid pressure therethrough.

20. A control valve according to claim 19, comprising an inlet port in said housing adapted for connection with a source of braking fluid pressure, an outlet port in said housing adapted for connection with at least one brake of said system, an exhaust port in said housing for connection with said outlet port, fourth valve means movable in said housing and controlling pressure fluid communication between said inlet, outlet and exhaust ports, said relay means including a piston slidable in said housing and having opposed sides, one of said opposed sides being subjected to the control fluid pressure in said control chamber, extension means on the other of the opposed sides of said piston having a free end thereon for engagement with said fourth valve means, said piston being initially movable in response to the control fluid pressure in said control chamber acting on said one side thereof to engage said free end with said valve means interrupting pressure fluid communication between said outlet and exhaust ports and being thereafter further movable to concertedly move said valve means toward a position establishing metered pressure fluid communication between said inlet and outlet ports, the established fluid pressure at said outlet port acting on the other of the opposed sides of said piston in opposition to the control fluid pressure in said control chamber acting on said one opposed side.

21. A control valve for an anti-lock brake system comprising a housing, relay means movable in said housing for controlling said system and defining with said housing a chamber for control fluid pressure, said relay means being operable generally in response to control fluid pressure in said chamber to effect a metered application and exhaustion of braking fluid pressure to and from said system, a control port in said housing for selective connection with supplied and exhausting flow of control fluid pressure, a restricted passage in said housing connected between said control port and chamber, a pair of solenoid means in said housing adapted for energization upon the occurrence of different preselected conditions in said system and defining with said housing at least portions of said restricted flow passage, one of said solenoid means including valve means movable in said restricted flow passage and controlling the flow of control fluid pressure therethrough, said valve means being movable toward a position in said restricted flow passage isolating the control fluid pressure in said chamber from that at said control port upon the energization of said one solenoid means in response to the occurrence of one of said preselected conditions and the other of said solenoid means including other valve means movable in said restricted flow passage and controlling the exhaustion of control fluid pressure therefrom, said other valve means being movable toward a position in said restricted flow passage exhausting isolated control fluid pressure therethrough from said chamber upon the energization of said other solenoid means in response to the occurrence of a different preselected condition only when said first named valve means is in its isolating position.

22. A control valve according to claim 2, wherein said second solenoid means includes valve means movable toward a position to effect the venting of the isolated control fluid pressure upon the energization of said second solenoid means.

23. A control valve according to claim 2, comprising exhaust passage means in said housing and subjected to the isolated control fluid pressure, said second solenoid means normally closing said exhaust passage means.

24. A control valve according to claim 23, comprising a valve seat in said housing about said exhaust passage means, and said second solenoid means including valve means for engagement with said valve seat, said valve means being normally urged into engagement with said valve seat to close said exhaust passage means and said valve means being movable toward a position disengaged from said valve seat to open said exhaust passage means effecting the venting of the isolated control fluid pressure therethrough upon the energization of said second solenoid means.

25. A control valve according to claim 2, comprising exhaust passage means in said housing for communication with the isolated control fluid pressure, said first solenoid means normally closing said exhaust passage means.

26. A control valve according to claim 25, comprising a valve seat in said housing about said exhaust passage means, and said first solenoid means including valve means for engagement with said valve seat, said valve means being normally urged into engagement with said valve seat and being movable toward a position disengaged from said valve seat upon the energization of said first solenoid means.

27. A control valve according to claim 2, comprising first and second exhaust passage means in said housing for communication with the isolated control fluid pressure, first and second valve seats in said housing about said first and second exhaust passage means, said first and second solenoid means including first and second valve means engaged with said first and second valve seats to close said first and second exhaust passage means, and said first and second valve means being movable toward positions disengaged from said first and second valve seats upon the energization of said first and second solenoid means, respectively.

28. A control valve according to claim 27, comprising a flow passage in said housing for the flow therethrough of the control fluid pressure upon the subjection thereof to said relay means, a third valve seat in said housing about said flow passage, and third valve means on said first solenoid means for engagement with said third valve seat, said third valve means being movable into engagement with said third valve seat to isolate the control fluid pressure acting on said relay means.

29. A control valve according to claim 8, wherein said flow passage is restricted to predeterminately reduce the rate of flow of said control fluid pressure therethrough.

30. A control valve according to claim 11, wherein said first named and other exhaust passage means are restricted to predeterminately reduce the rate of venting flow of the isolated control fluid pressure therethrough, respectively.

31. A control valve according to claim 30, wherein one of said first named and other exhaust passage means is more restricted than the other thereof so that the rate of venting flow of the isolated control fluid pressure through said one of said first named and other exhaust passage means is predeterminately less than that through the other of said first named and other exhaust passage means.

32. A control valve according to claim 1, comprising exhaust passage means in said housing for communication with the isolated control fluid pressure, said solenoid valve normally closing said exhaust passage means.

33. A control valve according to claim 32, comprising a valve seat in said housing about said exhaust passage means, and said solenoid valve including valve means normally engaged with said valve seat to close said exhaust passage means and said valve means being movable toward a position disengaged from said valve seat to open said exhaust passage means venting the isolated control fluid pressure therethrough upon the energization of said solenoid valve.

34. A control valve according to claim 1, comprising a flow passage in said housing for the flow therethrough of the control fluid pressure upon the subjection thereof to said relay means, a valve seat in said housing about said flow passage, said solenoid valve including valve means for engagement with said valve seat, said valve means being movable into engagement with said valve seat to close said flow passage and isolate the control fluid pressure acting on said relay means upon the energization of said solenoid valve.

35. A control valve according to claim 34, comprising exhaust passage means in said housing for communication with the isolated control fluid pressure, another valve seat in said housing about said exhaust passage means, and said solenoid valve including other valve means for engagement with said other valve seat, said other valve means being movable toward a position disengaged from said other valve seat to vent th isolated control fluid pressure through said exhaust passage means upon the energization of said solenoid valve to engage said first named valve means with said first named valve seat.

36. A control valve for an anti-lock brake system comprising a housing having a control port therein, relay means movable in said housing and defining therewith a control chamber connected with said control port, said relay means being operable generally in response to control fluid pressure in said control chamber to effect the application through said housing of braking fluid pressure to said system, an exhaust port in said housing and connected with said control chamber, and an electric solenoid valve energized in response to a preselected condition for controlling pressure fluid communication between said control port and said control chamber and between said exhaust port and said control chamber, said solenoid valve being responsive to the occurrence of the preselected condition to interrupt pressure fluid communication between said control port and control chamber isolating the control fluid pressure therein acting on said relay means and also to establish pressure fluid communication between said exhaust port and said control chamber venting the isolated control fluid pressure in said chamber.

37. A control valve according to claim 36, comprising first and second valve seats in said housing between said control port and control chamber and between said exhaust port and control chamber, respectively, said solenoid valve including valve means normally engaged with said second valve seat and disengaged from said first valve seat, said valve means being movable toward a position engaged with said first valve seat isolating the control fluid pressure in said control chamber and toward a position disengaged from said second valve seat to vent the isolated control fluid pressure in said control chamber to said exhaust port.

38. A control valve according to claim 36, comprising another exhaust port in said housing and connected with said control chamber, and another electric solenoid valve in said housing energized in response to another preselected condition for controlling pressure fluid communication between said other exhaust port and chamber, said other solenoid valve being energized upon the occurrence of the other preselected condition to also establish pressure fluid communication between said other exhaust port and said control chamber venting the isolated control fluid pressure in said chamber.

39. A control valve according to claim 38, comprising a third valve seat in said housing between said control chamber and said other exhaust ports, and said other solenoid valve including other valve means normally engaged with said third valve seat, said other valve means being movable toward a position disengaged from said third valve seat to establish the pressure fluid communication between said other exhaust port and said control chamber venting the isolated control fluid pressure in said control chamber upon the energization of said other solenoid valve.

* * * * *

UNITED STATES PATENT OFFICE
CERTIFICATE OF CORRECTION

Patent No. 3,758,167     Dated September 11, 1973

Inventor(s) John A. Machek

It is certified that error appears in the above-identified patent and that said Letters Patent are hereby corrected as shown below:

Column 5, line 4, after "pressure" insert -- . Upon such rapid exhaustion of the control fluid pressure --. Column 6, line 1, "th" should read -- the --. Column 7, line 39, "104" should read -- 100 --. Column 9, line 43, "11" should read -- 2 --.

Signed and sealed this 9th day of April 1974.

(SEAL)
Attest:

EDWARD M.FLETCHER,JR.          C. MARSHALL DANN
Attesting Officer              Commissioner of Patents